US012409355B2

(12) United States Patent
Thompson

(10) Patent No.: US 12,409,355 B2
(45) Date of Patent: Sep. 9, 2025

(54) NON-FRANGIBLE THERMALLY RESPONSIVE FLUID CONTROL ASSEMBLIES FOR AUTOMATIC CORROSION RESISTANT SPRINKLERS

(71) Applicant: Minimax Viking Patent Management GmbH, Bad Oldesloe (DE)

(72) Inventor: Andrew T. Thompson, Hastings, MI (US)

(73) Assignee: Minimax Viking Patent Management GmbH, Bad Oldesloe (DE)

(*) Notice: Subject to any disclaimer, the term of this patent is extended or adjusted under 35 U.S.C. 154(b) by 0 days.

(21) Appl. No.: 17/974,020

(22) Filed: Oct. 26, 2022

(65) Prior Publication Data

US 2023/0118207 A1 Apr. 20, 2023

Related U.S. Application Data

(63) Continuation of application No. 16/636,889, filed as application No. PCT/US2019/050751 on Sep. 12, 2019, now Pat. No. 11,484,739.

(Continued)

(51) Int. Cl.
*A62C 37/12* (2006.01)
*A62C 37/08* (2006.01)

(52) U.S. Cl.
CPC .............. *A62C 37/12* (2013.01); *A62C 37/08* (2013.01)

(58) Field of Classification Search
CPC .. B05B 1/02; B05B 12/08; B05B 3/04; B05B 1/262; B05B 1/20; B05B 1/265;

(Continued)

(56) References Cited

U.S. PATENT DOCUMENTS 262,777 A * 8/1882 Hoblack ................ A62C 37/09 169/40
1,220,025 A 3/1917 Taylor
(Continued)

FOREIGN PATENT DOCUMENTS

AU 2014221510 A1 * 10/2015 ............. A62C 35/62
CA 2669743 A1 * 6/2008 ............. A62C 31/02
(Continued)

OTHER PUBLICATIONS

U.S. Appl. No. 17/974,020, filed Nov. 22, 2023_WO_2020163586_A1_H.pdf,Aug. 2020.*
(Continued)

*Primary Examiner* — Mirellys Jagan
(74) *Attorney, Agent, or Firm* — Perkins Coie LLP

(57) ABSTRACT

Corrosion resistant sprinklers and methods thereof include a sprinkler frame body having an internal passageway with an inlet and an outlet; a fluid deflecting member spaced from the outlet and means for non-frangible thermal actuation fluid control after exposure to an extreme salt environment. Means include a seal assembly disposed in the outlet, a screw member engaged with the sprinkler frame and a link assembly in a supporting orientation with respect to the sealing assembly to maintain and control transfer of a sealing force of the screw member against the seal assembly in a corrosive environment. Methods of obtaining or providing a corrosion resistant sprinkler include exposing sprinklers to a salt spray for an exposure period of over ten days and maintaining seal integrity after the exposure period and subsequently operating each sprinkler in a bath test within 3.5% of a nominal temperature rating of the sprinkler.

38 Claims, 9 Drawing Sheets

Related U.S. Application Data

(60) Provisional application No. 62/800,020, filed on Feb. 1, 2019, provisional application No. 62/731,679, filed on Sep. 14, 2018.

(58) Field of Classification Search
CPC .... B05B 1/14; B05B 1/28; B05B 1/30; B05B 1/32; B05B 1/326; B05B 12/085; B05B 13/005; B05B 13/0278; B05B 15/65; B05B 3/06; B05B 3/14; B05B 7/1431; B05B 7/144; B05B 9/00; B05B 7/00; B05B 3/00; B05B 12/002; B05B 12/081; B05B 15/00; B05B 9/04; B05B 1/044; B05B 15/60; B05B 7/1481; A62C 37/12; A62C 35/68; A62C 37/11; A62C 31/02; A62C 37/08; A62C 35/58; A62C 37/50; A62C 35/10; A62C 35/13; A62C 37/14; A62C 37/04; A62C 2/242; A62C 99/009; A62C 3/08; A62C 35/023; A62C 5/033; A62C 99/0045
See application file for complete search history.

(56) References Cited

U.S. PATENT DOCUMENTS

| | | | | |
|---|---|---|---|---|
| 1,282,074 | A * | 10/1918 | Hamilton | A62C 35/023 169/7 |
| 1,469,336 | A | 10/1923 | Rowley | |
| 3,130,790 | A * | 4/1964 | Hodgman, Jr. | A62C 37/12 169/40 |
| 3,498,383 | A | 3/1970 | Vorkapich | |
| 3,598,317 | A * | 8/1971 | Roberts | B05B 3/06 239/251 |
| 3,797,746 | A | 3/1974 | Gray et al. | |
| 3,896,880 | A | 7/1975 | Asp | |
| 4,421,053 | A * | 12/1983 | Volk | G01K 11/06 374/E11.006 |
| 4,580,729 | A | 4/1986 | Pounder | |
| 4,623,023 | A | 11/1986 | Retzloff et al. | |
| 5,083,616 | A * | 1/1992 | Polan | A62C 37/14 169/37 |
| 5,094,298 | A | 3/1992 | Polan | |
| 5,632,339 | A | 5/1997 | Fenske et al. | |
| 5,893,418 | A | 4/1999 | Ponte | |
| 7,584,803 | B2 * | 9/2009 | Ballard | A62C 31/02 169/41 |
| 9,440,104 | B2 * | 9/2016 | Ringer | A62C 37/14 |
| 10,661,107 | B2 * | 5/2020 | Workman | A62C 35/60 |
| 11,213,707 | B2 * | 1/2022 | Wancho | A62C 37/14 |
| 11,511,145 | B1 * | 11/2022 | Sekula | A62C 37/50 |
| 11,701,534 | B2 * | 7/2023 | Bancroft | F16L 17/04 169/41 |
| 2006/0219817 | A1 * | 10/2006 | Franson | A62C 37/08 169/41 |
| 2008/0308285 | A1 | 12/2008 | Su et al. | |
| 2010/0006304 | A1 * | 1/2010 | Johnson | A62C 37/16 169/19 |
| 2015/0021415 | A1 | 1/2015 | Avila | |
| 2018/0133725 | A1 | 5/2018 | Silva, Jr. et al. | |
| 2021/0370113 | A1 * | 12/2021 | Franson | B05D 7/16 |
| 2023/0057561 | A1 * | 2/2023 | Watson | B05B 15/16 |
| 2023/0160512 | A1 * | 5/2023 | Wolin | F16L 37/0885 169/37 |

FOREIGN PATENT DOCUMENTS

| | | | | |
|---|---|---|---|---|
| CA | 2884358 A1 * | 6/2008 | A62C 31/02 |
| CA | 2779127 A1 * | 5/2011 | A62C 35/62 |
| DE | 2140032 A * | 2/1973 | B01D 47/08 |
| EP | 2547405 B1 * | 1/2017 | A62C 35/68 |
| ES | 2739224 T3 * | 1/2020 | A62C 35/68 |
| GB | 25349 | 7/1911 | |
| GB | 1511802 | 5/1978 | |
| GB | 2283441 A * | 5/1995 | B05B 1/14 |
| JP | S60245784 A * | 12/1985 | |
| JP | H11206907 A * | 8/1999 | |
| KR | 20080034748 A * | 4/2008 | |
| NL | 7104483 A * | 10/1971 | A62C 2/242 |
| WO | WO 2008/067421 | 6/2008 | |
| WO | WO-2008067421 A2 * | 6/2008 | A62C 31/02 |
| WO | WO 2014/047485 | 3/2014 | |
| WO | WO 2016/019392 | 2/2016 | |
| WO | WO-2020056091 A2 * | 3/2020 | A62C 37/12 |
| WO | WO2020163586 A1 * | 8/2020 | |

OTHER PUBLICATIONS

U.S. Appl. No. 17/974,020, filed Nov. 22, 2023_WO_2008067421_A2_H.pdf,Jun. 2008.*

U.S. Appl. No. 17/974,020, filed Nov. 27, 2023_KR_20080034748_A_H.pdf,Apr. 2008.*

U.S. Appl. No. 17/974,020, filed Nov. 22, 2023_CA_2669743_A1_H.pdf,Jun. 2008.*

International Searching Authority, International Search Report and Written Opinion in International Appln. No. PCT/US2019/050751, Jul. 3, 2020, 22 pages.

The Viking Corporation, Technical Bulletin, Sprinkler Corrosion Resistant Finishes, Form No. F_012513, Jul. 31, 2013, 1 page.

* cited by examiner

NON-FRANGIBLE THERMALLY RESPONSIVE FLUID CONTROL ASSEMBLIES FOR AUTOMATIC CORROSION RESISTANT SPRINKLERS

PRIORITY CLAIM & INCORPORATION BY REFERENCE

This application is continuation application of U.S. patent application Ser. No. 16/636,889, filed Feb. 5, 2020, which is 35 U.S.C. § 371 application of International Application No. PCT/US2019/050751, filed Sep. 12, 2019, which claims the benefit of U.S. Provisional Application No. 62/731,679 filed Sep. 14, 2018 and U.S. Provisional Application No. 62/800,020 filed Feb. 1, 2019, each of which is incorporated by reference in its entirety.

TECHNICAL FIELD

The present invention relates generally to sealing and actuating assemblies for automatic sprinklers. More specifically, the present invention is directed to a non-frangible thermally responsive fluid control assembly for corrosion resistant sprinklers.

BACKGROUND ART

Generally, automatic fire protection sprinklers include a solid metal frame having a body and some type of deflector coupled to the frame to distribute fluid discharged from the body in a defined spray distribution pattern over an area to address a fire. Fluid discharge from an automatic fire protection sprinkler is automatically controlled by operation of a heat-responsive actuator that maintains a fluid tight seal at the discharge orifice by transferring a compressive sealing force on a cap (button or disc) or other sealing assembly from a load member such as, for example, a screw member engaged with the sprinkler frame that acts on the actuator. When the temperature surrounding the sprinkler is elevated to a pre-selected value indicative of a fire, the actuator operates and thereby ceases transfer of the sealing force, permitting ejection and release of the cap by the discharge of fluid through the unsealed sprinkler. There are generally two types of thermally responsive actuators: frangible and non-frangible. Frangible actuators generally include a liquid-filled frangible bulb that shatters upon reaching its rated temperature. Non-frangible actuators can include fusible links or soldered mechanical arrangements in which the components of the assembly separate upon fusion of the solder reaching its rated temperature. An exemplary fusible link is shown and described in U.S. Pat. No. 4,623,023.

Automatic sprinklers are used in a variety of environments including manufacturing facilities. In these facilities, the sprinklers may be installed in corrosive environments or exposed to corrosive conditions. Over time, corrosive effects can prevent or interfere with the proper sprinkler thermal response, ejection and/or fluid distribution. To combat the impact of corrosive effects on fire protection, there are corrosion resistant sprinklers. A "corrosion resistant sprinkler" is a sprinkler that is designed to resist exterior elements that attack a standard brass sprinkler. Corrosion resistant sprinklers are fabricated from corrosion resistant materials, such as for example, solid stainless steel. Fabricating sprinklers from such a material can provide for a sprinkler frame that is uncoated and thus free of a separate material for corrosion resistance. Such uncoated frames can be treated with a passivation process, such as for example, ASTM A967/A967-M-17: Standard Specification for Chemical Passivation Treatments for Stainless Steel Parts." Even without specific treatment, some alloys including stainless steel are self-passivating and thus provide a self-generating corrosion resistant coating. As used herein, self-passivating is a material property by which a base material becomes corrosion resistant by a microcoating that is created by oxygen in the atmosphere reacting with the base material. Corrosion resistant sprinklers can be made of a material that has a resistance to corrosion equal to or exceeding that of bronze alloy having a minimum copper content of 80 percent. A corrosion resistant sprinkler is distinguished from one that is "corrosion proof." Corrosion proof is a sprinkler having a coating that can withstand corrosive effects. In order for a corrosion resistant sprinkler to be used in corrosive environments, such sprinklers are evaluated for their performance integrity under such conditions including their seal integrity and thermal responsiveness. Such integrity tests include evaluating the seal integrity of a corrosion resistant sprinkler after exposure to an extreme salt environment. As used herein an "extreme salt environment" is one at least equal to a misting environment having a sodium chloride concentration of 20% by weight.

Fire protection sprinklers sold and used as corrosion resistant sprinklers are generally subject to industry accepted fire code requirements and the approval of the "authority having jurisdiction" (AHJ) to ensure compliance with the applicable codes and requirements. One manner of satisfying the applicable requirements, is by identification of fire protection sprinklers capable of corrosion performance through appropriate industry accepted corrosion and operating testing. To facilitate the AHJ approval process, fire protection equipment can be "listed," which as defined by NFPA 13, means that the equipment is included in a list by an organization that is acceptable to the AHJ and whose list states that the equipment "meets appropriate designated standards or has been tested and found suitable for a specified purpose." One such listing organization includes, Underwriters Laboratories Inc. ("UL"). UL Standard for Safety for Automatic Sprinklers for Fire-Protection Service UL 199 (11th ed. 2005, rev. 2008) ("UL 199") provides a corrosion and operating temperature test for corrosion resistant sprinklers. Similar testing standards for corrosion resistant sprinklers are provided by FM Approvals LLC ("FM"). Such FM Approvals include: (i) "Approval Standard for Automatic Sprinklers for Fire Protection-Class Number 2000" (February 2018) ("FM 2000"); (ii) "Approval Standard for Quick Response Storage Sprinklers for Fire Protection-Class Number 2008" (February 2018) ("FM 2008"); or (iii) "Approval Standard for Residential Sprinklers for Fire Protection-Class Number 2030" (August 2009) ("FM 2030").

As part of the requisite performance testing for corrosion resistant sprinklers in an extreme salt environment, each of the UL and FM standards have a 30-Day corrosion test and an operating temperature bath test in addition to other corrosion resistant testing. Generally, the test sprinklers are exposed to a specific corrosive environment for 30 days to determine whether the sprinkler and its actuator can maintain its fluid tight seal. If the sprinkler satisfies the 30-day test, the sprinkler is subjected to a thermal sensitivity test and an operating temperature bath test. In the thermal sensitivity test, the tested sprinkler is exposed to an air stream at a controlled temperature and velocity and its actuation response is determined for evaluating sensitivity compliance. In the bath test, the tested sprinkler is exposed to a heated bath which is raised to the stated operating temperature to verify that the sprinkler and its actuator appropriately thermally responds and operates. The standards include other applicable corrosion resistance tests depending upon the material and/or configuration of the sprinkler. Additional corrosion resistance tests can include stress cracking testing, carbon dioxide-sulfur dioxide exposure testing, and/or hydrogen sulfide testing.

Although there are known corrosion resistant sprinklers, it believed that there are no known corrosion resistant sprinklers with a thermally responsive non-frangible actuator that have passed both 30-day corrosion testing and operating temperature testing. Moreover, there are no known corrosion resistant sprinklers with a thermally responsive non-frangible actuator that have passed each of the 30-day corrosion testing, thermal sensitivity and operating temperature testing. For certain facilities, such as for example food processing plants, installing corrosion resistant sprinklers with frangible glass bulb-type actuators can create operational problems because of the difficulty in recovering and cleaning any glass remnants from bulbs that have been shattered either by thermal actuation or by inadvertent contact from equipment or personnel. Accordingly, there is a need for corrosion resistant sprinklers with a non-frangible thermally responsive actuator and seal assembly that can control fluid discharge and is capable of withstanding applicable corrosive testing. In particular, there is a need for corrosion resistant sprinklers with a non-frangible thermally responsive fluid control assembly that is capable of withstanding an extreme corrosive salt environment.

DISCLOSURE OF INVENTION

Preferred embodiments of an automatic corrosion resistant fire protection sprinkler are provided that preferably include a corrosion resistant frame and non-frangible thermally responsive fluid control assembly. Preferred embodiments of the non-frangible thermally responsive fluid control assembly include a seal assembly and a thermally rated link assembly disposed in a supporting orientation with respect to one another to maintain and control transfer of a sealing force against the seal assembly in a corrosive environment. A preferred non-frangible thermally responsive fluid control assembly includes a seal assembly, a screw member, and a thermally rated link assembly disposed in a supporting orientation with respect to the sealing assembly to maintain and control transfer of a sealing force of the screw member against the seal assembly in a corrosive environment. The preferred non-frangible thermal actuation fluid control assembly and the preferred relative orientations and geometric relationships between the components minimizes and more preferably eliminates any corrosion bridging between the sprinkler components that would otherwise prevent ejection of the seal assembly and/or collapse of the transfer member(s) upon fusion of the thermally rated material. Moreover, preferred embodiments of the fluid control assembly include components having material properties that contribute to the corrosion resistance of the assembly independent of and in conjunction with the relative orientations and geometric relationships. Accordingly, the preferred non-frangible thermally responsive fluid control assembly can maintain seal integrity and proper thermal responsiveness in an extreme salt environment.

A preferred embodiment of a corrosion resistant sprinkler includes a sprinkler frame body having an inlet and an outlet with a passageway disposed therebetween along a sprinkler longitudinal axis. A pair of frame arms preferably extend from the body and converging toward the sprinkler axis to form a sprinkler boss with a screw member that is engaged with the sprinkler boss. A fluid deflecting member is coupled to the sprinkler boss. In preferred embodiments of the sprinkler assembly, the frame body and deflecting member are preferably fabricated from a self-passivating material such as, for example, stainless steel. The screw member can also be fabricated from stainless steel, but more preferably is fabricated from a corrosion resistant non-self-passivating alloy, such as for example, a nickel alloy that does not rely on the presence of oxygen to maintain or generate its corrosion resistant surface coating.

A preferred seal assembly is disposed within the outlet that includes an elongated seat member disposed in the outlet. The elongated seat member includes a cylindrical portion that extends into the internal passageway of the sprinkler frame body and a flanged portion is disposed adjacent and outside the outlet of the sprinkler frame body. The flanged portion has a face that preferably includes an elongated slot defined by a slot width and a slot length extending the width of the face. A preferred link assembly is disposed internally with respect to the frame arms to support the seal assembly within the outlet by transferring a compressive sealing force generated preferably by the screw member to the seal assembly.

The preferred link assembly includes a trigger member and a support member joined to one another by thermally rated fusible material. In the preferred embodiment, the trigger member has a solder engagement portion and a canopy or lever portion extending perpendicular to the solder engagement portion. In a preferred embodiment of the trigger member, the lever portion includes a receptacle formed in the first surface for receipt of the leading tip portion of the screw or other load member to define an annular gap therebetween. Moreover, preferred embodiments of the trigger member include a preferred connector formed between the lever and solder engagement portions. The support member is soldered to the solder engagement portion of the trigger member. A preferred embodiment of the support member includes an elongated indentation defining a preferred geometry for housing the solder. The support member has a preferred first edge engaged with the elongated slot of the elongated member of the seal assembly and a second edge located adjacent to and more preferably in contact with the lever portion of the trigger member. The first edge of the support member has a linear length preferably equal to the slot length of the seat member. Moreover, the first edge of the support member preferably defines a thickness that is less than the elongated slot width of the seat member.

The preferred seal, screw member and link assemblies provide exemplary means for non-frangible thermally responsive fluid control that is resistant to corrosive environments. Preferred embodiments of the corrosion resistant sprinkler have been shown to support and maintain the fluid tight seal of the corrosion resistant sprinkler after exposure in an extreme salt spray test for more than ten days and preferably for at least thirty days. Moreover, the preferred corrosion resistant sprinkler has been shown to provide for the desired thermal and actuation response by appropriately actuating in a heated operating test bath. Accordingly, preferred means provide for non-frangible thermal actuation control after exposure to an extreme salt environment. Preferred methods of qualifying a fire protection sprinkler for corrosion resistance and corrosion resistant fire protection are also provided. Additionally, the sprinklers provide a preferred method of corrosion resistant fire protection which includes obtaining a sprinkler qualified for corrosion resistance and distributing the sprinkler for installation in a corrosive environment.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
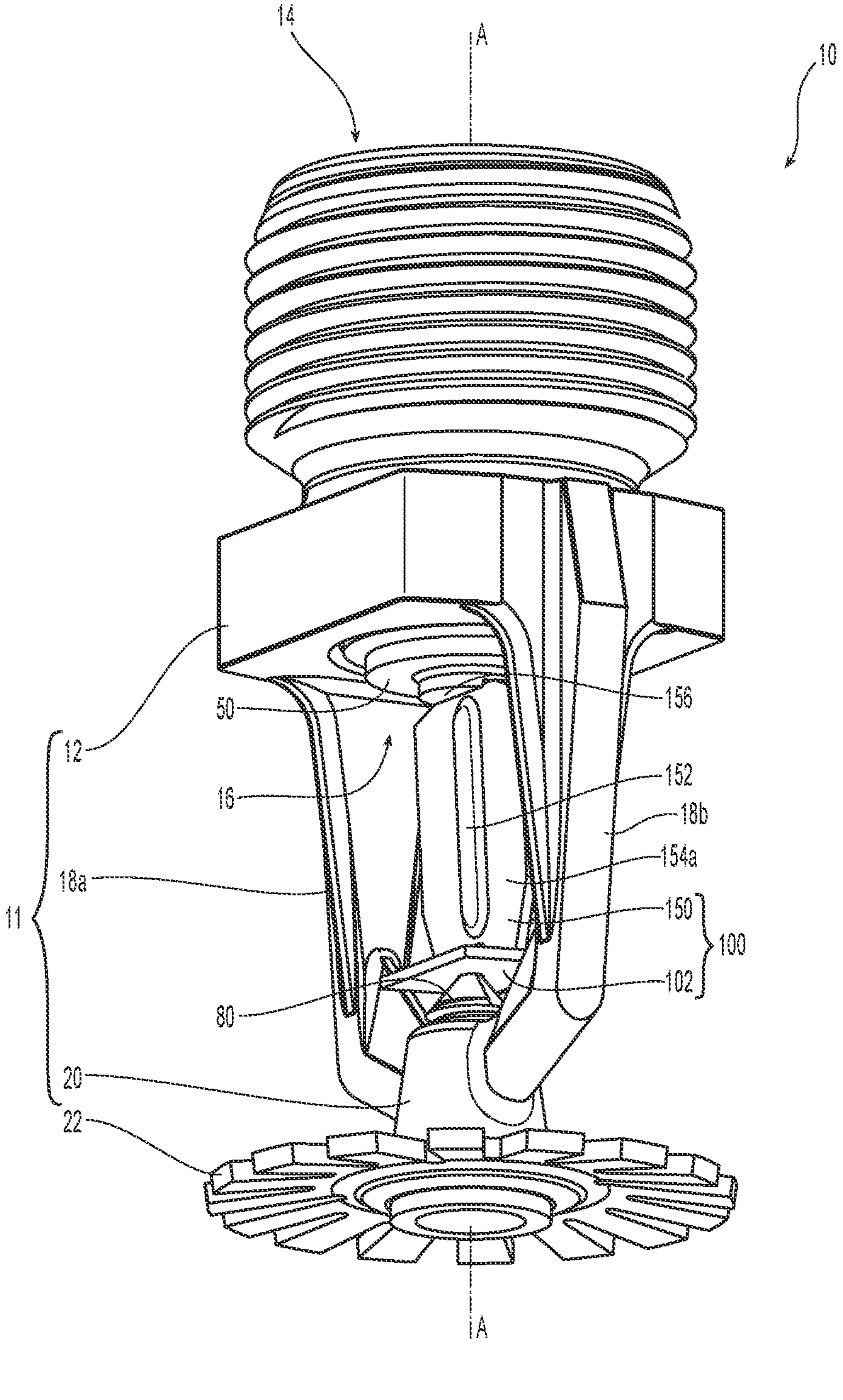
FIGS. 1-2 are various perspective views of a preferred embodiment of a corrosion resistant sprinkler.
Figure 2:
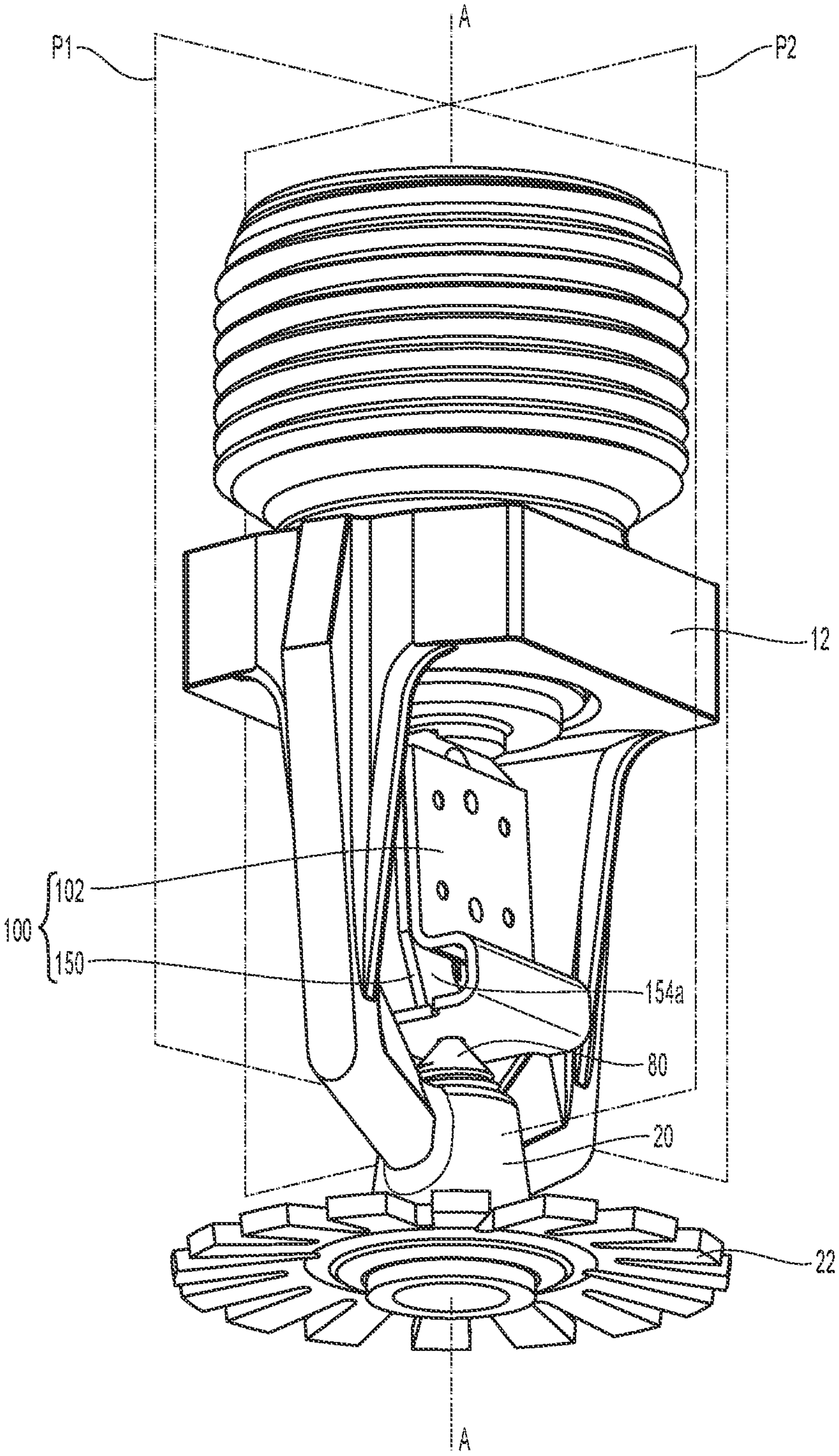
Figure 3:
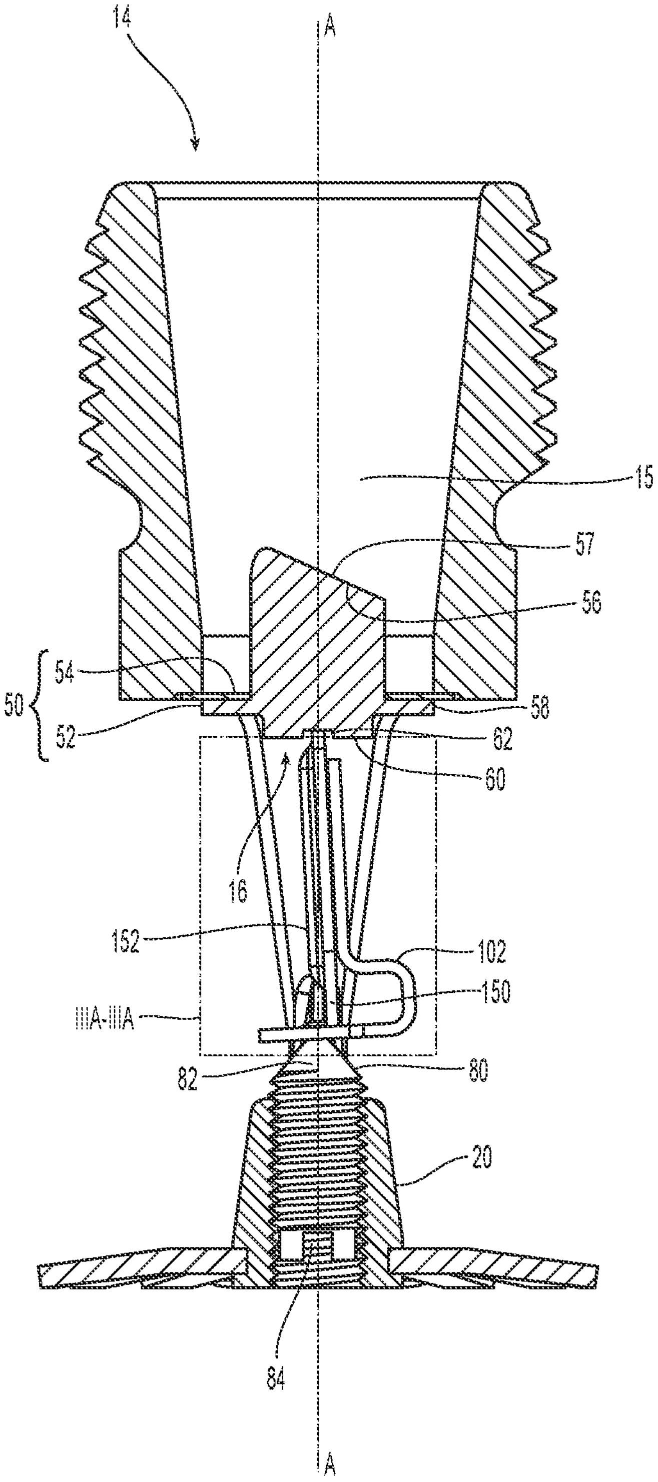
FIGS. 3, 3A & 3B are cross-sectional views of the sprinkler of FIG. 1.

FIGS. 1, 2 and 3 show various illustrative embodiments of a preferred automatic fire protection sprinkler 10 that includes a sprinkler frame 11 having a body 12 with an inlet 14 and an outlet 16 with an internal passageway 15 extending between the inlet 14 and the outlet 16 along a sprinkler longitudinal axis A--A. Preferably extending from the body 12 are a pair of frame arms 18*a*, 18*b* that converge toward the sprinkler axis A--A-to form a sprinkler boss 20. A fluid deflecting member 22 spaced from the outlet 16 is preferably coupled to the sprinkler boss 20 for the distribution of firefighting fluid discharged from the outlet 16 upon thermal actuation of the sprinkler 10 in order to address a fire. The sprinkler 10 and its deflecting member 22 are shown in a pendent orientation, but it should be understood that the sprinkler 10 can be configured with an appropriate deflecting member for an upright orientation. The sprinkler 10 is preferably embodied as a corrosion resistant sprinkler in which the sprinkler frame 11 and deflecting member 22 are preferably formed or fabricated from a corrosion-resistant material, such as for example, solid stainless steel, such as for example, UNS-J92800, UNS-S32205, or UNS-S31600. The sprinkler frame 11 and deflecting member 22 are preferably subject to a post-fabrication passivation process per ASTM A 967 to enhance the inherent corrosion resistance of the stainless steel.

The automatic sprinkler 10 includes a preferred means for non-frangible thermally responsive fluid control suitable for use in an environment that can be as corrosive as an extreme salt environment. Generally, the preferred means includes a seal assembly disposed in the outlet of the sprinkler frame and a non-frangible thermally responsive link assembly that controls transfer of a compressive force to the seal assembly to control fluid discharge from the sprinkler outlet. More preferably, the preferred means includes a seal assembly disposed in the outlet of the sprinkler frame, a screw member engaged with the sprinkler frame to generate the compressive sealing force and a non-frangible thermally responsive link assembly that controls transfer of the compressive force to the seal assembly to control fluid discharge from the sprinkler outlet. In a preferred embodiment of the means, the link is a multi-member assembly that is preferably held together by a thermally rated fusible material, such as for example a eutectic solder that maintains one or more members of the link assembly in a supporting orientation to directly or indirectly transfer the sealing force to the seal assembly. The supporting orientation minimizes and more preferably eliminates any corrosion bridging that would prevent ejection of the seal assembly and/or collapse of the link member(s) upon melting of the solder. Additionally or alternatively, the screw member is preferably made of a material to minimize and more preferably eliminate corrosive effects on the engagement between the screw member and the link assembly which would otherwise impair proper sealing force generation and transfer. In particular embodiments, the screw member is fabricated from a corrosion resistant material that is non-self-passivating. As used herein, a "non-self-passivating" material is a material that does not require reaction between the base material and the surrounding atmosphere to create its corrosion resistant surface coating. An exemplary non-self-passivating material is nickel alloy.

The preferred means can maintain seal integrity in an extreme salt environment and thus can provide the desired non-frangible thermally responsive fluid control in corrosive conditions. As described herein, the preferred means has been shown to support and maintain the fluid tight seal of the corrosion resistant sprinkler after exposure to an extreme salt environment over a significant period of time, e.g. more than ten days and more preferably at least 30 days. In addition, after the extreme salt exposure, the preferred means has been shown to appropriately thermally respond to a heated ambient temperature by collapsing and separating from the seal assembly. Thus, the preferred means can maintain a fluid tight seal and provide for the desired thermal and actuation response despite exposure to such corrosive conditions. Although, the preferred means described herein provide for a corrosive resistant non-frangible means for use with the corrosion resistant sprinkler frame and deflector, the preferred means can alternatively be used in a corrosion proof sprinkler assembly in which the sprinkler frame and/or deflector is coated with special coatings, plating, or finish. Further in the alternative, preferred embodiments of the non-frangible means can be incorporated into a standard brass sprinkler frame.

A preferred embodiment of the non-frangible means includes a seal assembly 50 disposed within the outlet 16, a fusible thermally responsive link assembly 100 in contact with the seal assembly 50 to define the preferred supporting orientation with respect to one another and a preferred screw member 80 engaged with the link assembly 100 to transfer a compressive sealing force against the seal assembly 50. In response to a sufficiently high ambient temperature, the link assembly 100 thermally fuses, collapses, separates from the seal assembly 50 and the seal assembly 50 ejects from the outlet 16 under internal fluid pressure. Fluid discharged from the outlet 16 impacts the deflector member 22 to address a fire.

The inlet 14, internal passageway 15 and outlet 16 define the sprinkler orifice and its discharge characteristics of the sprinkler. As is known in the art, the discharge characteristics of a sprinkler is determined by its K-factor, which is defined by $K=Q/P^{1/2}$, where Q represents the flow rate (in gallons/min (GPM)) of water from the outlet of the internal passage through the sprinkler body and P represents the pressure (in pounds per square inch (psi)) of water or firefighting fluid fed into the inlet end of the internal passageway though the sprinkler body. The discharge characteristics of the preferred sprinkler body 12 define a nominal K-factor in a range of 5.6 to 28.0 GPM/(psi)$^{1/2}$ [80 to 400 L/min/(bar)$^{1/2}$]. More particularly, preferred embodiments of the sprinkler and sprinkler body for use in the sprinkler 10 defines a nominal K-factor which range from 5.6 to 14.0 GPM/(psi)$^{1/2}$ [80 to 200 L/min/(bar)$^{1/2}$] and are yet even more preferably any one of 5.6, 8.0, or 11.2 GPM/(psi)$^{1/2}$ [80, 115, or 160 L/min/(bar)$^{1/2}$] and are even more preferably 8.0 GPM/(psi) 12 [115 L/min/(bar)$^{1/2}$].

Figure 3A:
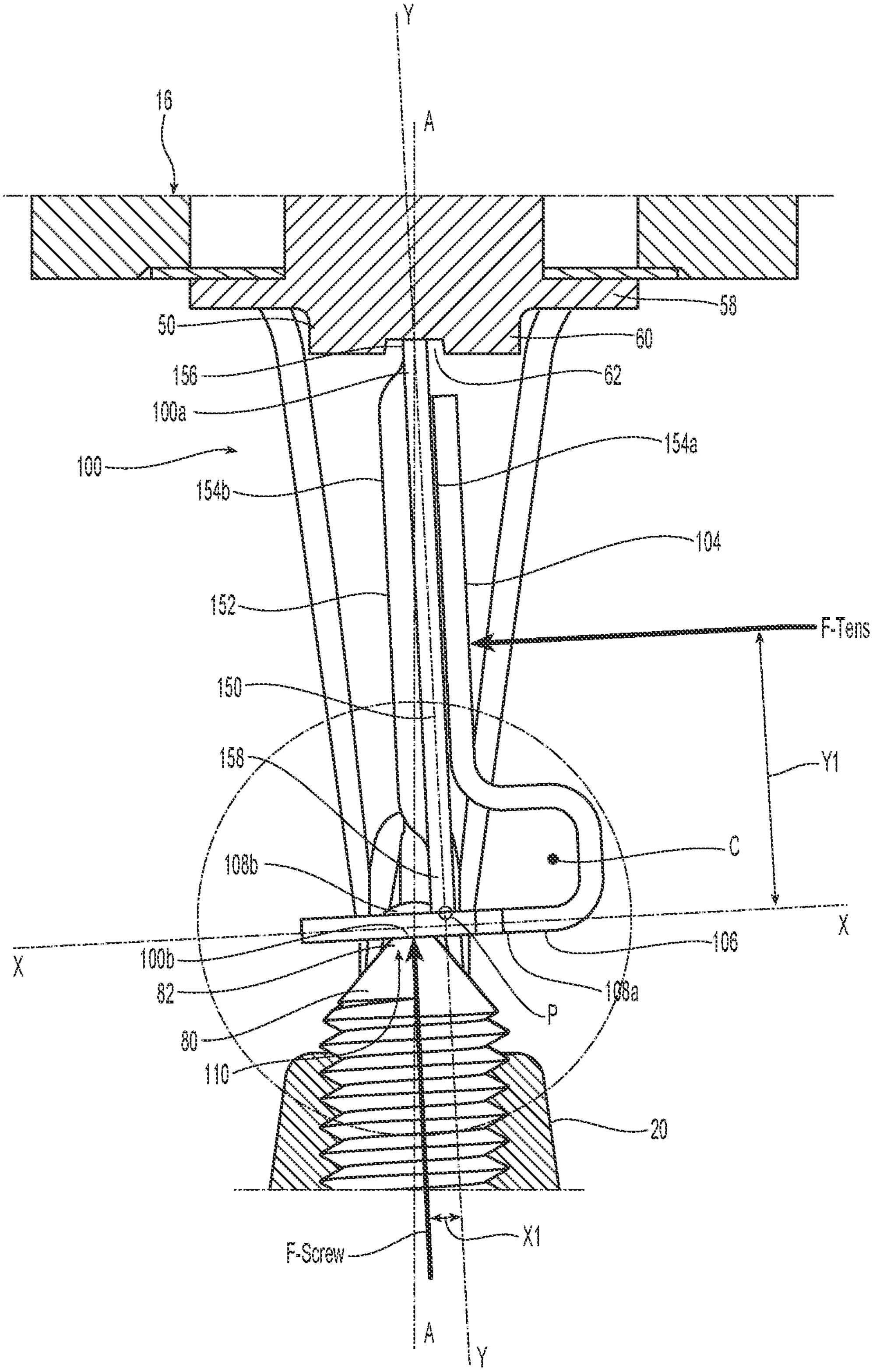
Figure 3B:
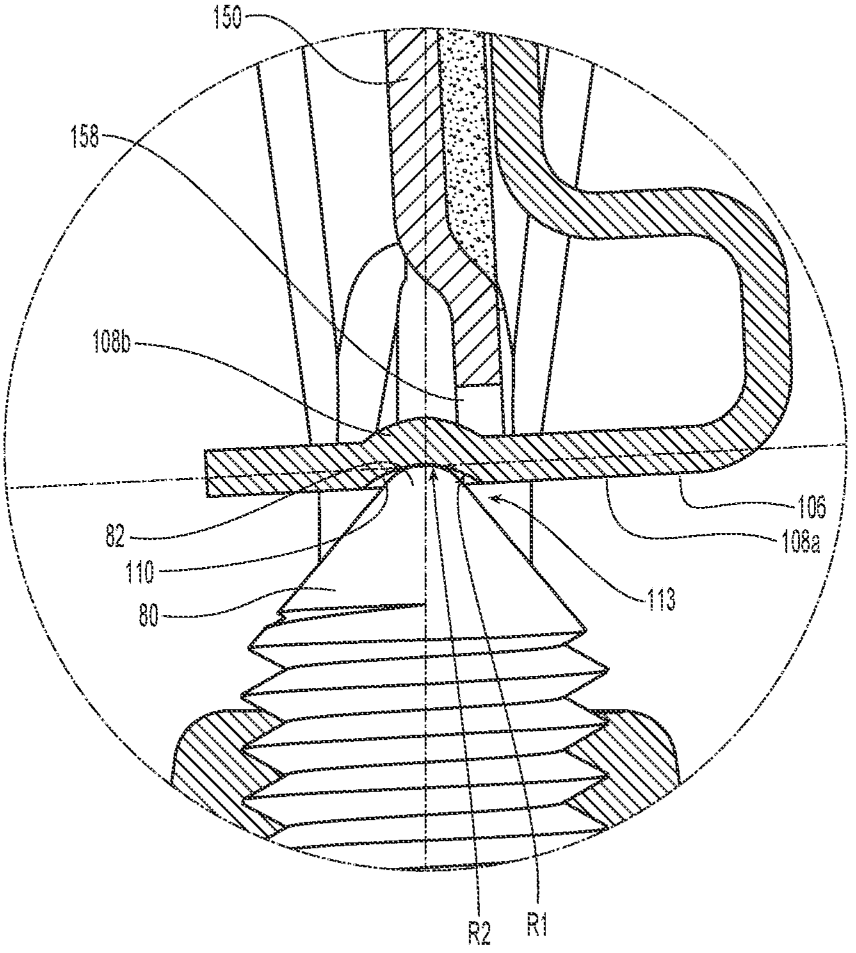

As seen in FIGS. 3A and 3B, the preferred link assembly 100 is held together by a thermally rated solder to support a first end 100*a* of the link assembly 100 in engagement within a recess of the seal assembly 50 disposed in the outlet 16 and to support a second end 100*b* of the link assembly having a receptacle 110 formed therein for engagement with the compression or load screw 80 to transfer the compressive force from the screw 80 to the seal assembly 50. The engagement between the first end 100*a* of the link assembly and the seal assembly 50 defines a preferred geometry in which the recess surface area has a ratio of exposed area-to-area in contact with the first end 100*a* of the link assembly which preferably ranges from 2:1 to 2.5:1. In one preferred embodiment, a minimum surface area of contact between the first end 100*a* of the link and the seal assembly is preferably 0.007 square inches to form a fluid tight seal. The preferred ratio minimizes and more preferably eliminates corrosion build-up that may bridge between the link assembly 100 and the seal assembly 50 that would otherwise interfere with sprinkler actuation and operation upon melting of the solder in the appropriate ambient temperature and the subsequent ejection of the seat assembly 50 under the internal fluid pressure delivered to the sprinkler.

Additionally or alternatively, the engagement between the second end 100*b* of the link and the load screw 80 defines another preferred geometry to define a preferred annular crevasse or gap about the load screw 80. In a preferred aspect, a minimum surface area of contact between the second end 100*b* of the link assembly and the load screw 80 is sufficient to form the engagement between the components while minimizing and more preferably eliminating corrosion build-up that may bridge between the link assembly 100 and the load screw 80 that might interfere with proper sealing function in the unactuated state of the sprinkler assembly or otherwise interfere with the proper sprinkler actuation and operation upon melting or fusion of the solder. In preferred embodiments described herein, the receptacle 110 defines a maximum depth and the engagement defines a maximum width of the annular gap between the screw 80 and the link 80, which together define a preferred ratio of maximum gap width-to-maximum receptacle depth that ranges from 2:1 to 3:1. The screw member 80 is preferably fabricated from a corrosion resistant non-self-passivating material. Thus, to the extent a corrosion build-up forms at the engagement site between the link assembly 100 and the screw member 80 thereby depriving the site of oxygen for self-passivation, the non-self-passivating property of the preferred screw member 80 can provide corrosion resistance to the assembly. Similarly, for embodiments of the sprinkler assembly 10 that do not include an annular gap between the link 100 and the screw member 80 to expose the screw to atmosphere, a preferred non-self-passivating screw member 80 can provide corrosion resistance to the assembly at the second end 110*b* of the link assembly.

Preferred embodiments of the sprinkler assembly 10 were subjected to a series of corrosion resistance tests, as described herein, including a corrosion salt spray test and an operating temperature liquid bath test performed preferably in accordance with one or more of industry accepted standards, such as for example in accordance with any one of FM Approval Standards FM 2000, FM 2008, FM 2030 or UL 199. The sprinkler assemblies passed the corrosive resistance tests thereby demonstrating their suitability for installation and use in a corrosive environment. Accordingly, by testing the preferred corrosion resistant sprinkler assembly and testing the sprinkler in an appropriate corrosion test, preferred methods for qualifying an automatic sprinkler for corrosion resistance are provided herein.

In one preferred corrosion test, preferred embodiments of a sprinkler were subjected to a corrosion salt spray test performed in accordance with FM 2000. A test group of as many as eight sprinklers are hydrostatically tested to confirm that there is no weep or leak points at or below 500 psi. Each sprinkler inlet was filled with deionized water and sealed with a plastic cap and supported within a test chamber in its intended installation orientation, e.g., pendent. The sprinklers were then exposed to a salt spray fog as specified by ASTM B117, Standard for Salt (Fog) Testing. Chamber conditions monitored daily include: chamber temperature, volume of condensation collected, and specific gravity of solution. The salt solution consisted of twenty percent (20%) by weight of common salt (sodium chloride) dissolved in deionized water. The samples were exposed for a period of over ten days and more preferably exposed for at least thirty days (30 days). After the exposure period, the test sprinklers are dried for a two-to-four day period and visually inspected for any signs of severe deterioration or impending failure. Without any such visual evidence, the test sprinklers were then subjected to a hydrostatic test pressure of 175 psi for one minute without leakage. The test sprinklers successfully passed by the visual and hydrostatic testing thereby demonstrating that the preferred sprinkler assemblies 10 could withstand an extreme salt environment and maintain seal integrity. Post-salt operational testing was conducted on the test sprinklers to show that the sprinkler assemblies still appropriately thermally respond despite the extreme salt exposure.

Following the salt fog exposure test, the test sprinklers were tested for conformance for sensitivity in accordance with FM 2000. The thermal sensitivity of the trigger assembly and sprinkler is characterized by Response Time Index ("RTI"), measured in units of (ft.-s)$^{1/2}$ [(m-s)$^{1/2}$]. For one or more tested sprinklers, the RTI was calculated based upon the time to sprinkler operation in a plunge test performed in accordance with FM 2000. The calculated RTI was then compared for compliance as falling within an appropriate Standard Response or Quick Response limits as specified by FM 2000.

According to the plunge test procedure, the test sprinklers are mounted within a test tunnel and placed under pneumatic pressure. The sprinkler and its thermally responsive trigger are exposed to a stream of gas at a given velocity and temperature specified under FM 2000 for the nominal temperature rating of the test sprinkler. Once exposed to the test gas stream, the time to sprinkler operation is monitored and determined. Generally, the RTI calculation is a function of: (i) the determined sprinkler operation time, (ii) the test gas temperature, and (iii) the nominal operating temperature and (iv) the thermal conductivity (C-factor) of the test sprinkler, which is defined as the measure of conductance between the sprinkler's heat responsive element and the other components of the sprinkler as measured in $(m/s)^{1/2}$ $[(f/s)^{1/2})]$. Under FM 2000, the RTI of a "Standard Response Sprinkler" is between 80 $(m\text{-}s)^{1/2}$ and 350 $(m\text{-}s)^{1/2}$ [between 145 $(ft.\text{-}s)^{1/2}$ and 635 $(ft.\text{-}s)^{1/2}$] with a C-factor equal to or less than 2.0 $(m/s)^{1/2}$ [3.62 $[(ft/s)^{1/2}]$. For a "Quick Response Sprinkler," the calculated RTI is equal to or less than 50 $(m\text{-}s)^{1/2}$ [90 $(ft\text{-}s)^{1/2}$] with a C-factor equal to or less than 1.0 $(m/s)^{1/2}$ [1.81 $[(ft/s)^{1/2}]$.

Preferred embodiments of the corrosion resistant sprinkler with their non-frangible link assemblies 100 are configured as Standard Response Sprinklers and complied accordingly in the thermal sensitivity plunge test after satisfactorily passing the 30-day salt fog exposure test. One preferred embodiment of sprinkler has a nominal temperature rating of 161° F. with a C-factor of 1.57 $(ft/s)^{1/2}$ to provide an RTI of about 185 $(ft\text{-}s)^{1/2}$ and more preferably 185.86 $(ft\text{-}s)^{1/2}$. Another preferred embodiment of sprinkler has a nominal temperature rating of 205° F. with a C-factor of 2.39 $(ft/s)^{1/2}$ to provide an RTI of about 215 $(ft\text{-}s)^{1/2}$ and more preferably 214.8 $(ft\text{-}s)^{1/2}$. By satisfying the RTI testing requirements, the preferred corrosion resistant sprinklers demonstrated that the preferred sprinkler assemblies 10 could maintain conformance with the appropriate thermal response despite the long-term exposure to the extreme salt conditions.

In another post-salt fog exposure test, the test sprinklers were subject to an operating temperature (liquid bath) test performed in accordance with FM 2000, which illustrates a typical test set-up. The operating test verify that the sprinkler actually operates within a preferred percentage of its marked nominal temperature rating when immersed in constant rate-of-temperature-rise liquid bath. More specifically under the standardized tests, for test sprinklers having a nominal temperature rating of less than 400° F., the sprinkler is to demonstrate an actual operating temperature within 3.5% of its nominal temperature rating. For test sprinklers having a nominal temperature rating of over 400° F., the sprinkler is to demonstrate an actual operating temperature within 7% of its nominal temperature rating. In accordance with the standardized test procedures, the sprinklers are placed in a test vessel on grate or rack above the bottom of the vessel. The vessel is filled with a liquid bath corresponding to the nominal rating of the sprinkler: (i) water for a nominal sprinkler temperature of 0-175° F.; (ii) glycerin for a nominal sprinkler temperature of 176-360° F.; and (iii) vegetable oil for a nominal sprinkler temperature over 361° F. The test sprinklers were immersed in the liquid.

In accordance with the test, the bath is raised to an initial test temperature within twenty degrees Fahrenheit (20° F./11° C.) of the temperature rating of the sprinkler. The test bath is then raised at a constant rate, preferably ranging from 0.5-0.8° F. per minute until the sprinkler is operated or until the bath temperature is twenty degrees Fahrenheit (20° F./11° C.) above the rated temperature of the test sprinklers. The test sprinklers satisfactorily passed the operating temperature test by operating as intended with the requisite percentage of their rated temperature. Accordingly, the preferred sprinkler assemblies 10 and their preferred seal and link assemblies resisted the corrosive effects of long-term exposure to the extreme salt conditions and properly actuated and separated within the rated temperature of the link assembly.

The seal assembly 50 and link assembly 100 define a preferred geometric engagement. With reference to FIG. 3, the preferred seal assembly 50 includes an elongated seat member 52 with a resilient seal 54, such as for example a Belleville spring, disposed about the seat member 52 to form a fluid tight seal with an internally formed sealing surface of the sprinkler body 12. The resilient seal 54 is preferably nickel alloy, encapsulated in PTFE and coated on both sides with PTFE tape. The preferred elongated seat member 52 includes a cylindrical portion 56 extending into the internal passageway 18 of the sprinkler frame body and a flanged portion 58 disposed adjacent and outside the outlet 16 of the sprinkler frame body 12. The cylindrical portion 56 preferably includes an asymmetrical chamfer 57 to facilitate ejection of the seal assembly upon actuation of the preferred non-frangible fusible link 100.

Figure 4:
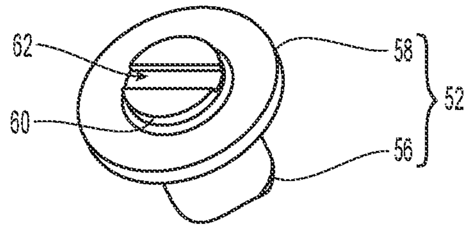
FIGS. 4, 4A-4D are various views of a preferred seal assembly for use in the FIG. 1.
Figure 4A:
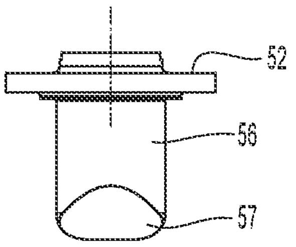
Figure 4B:
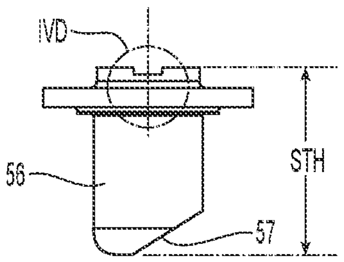
Figure 4C:
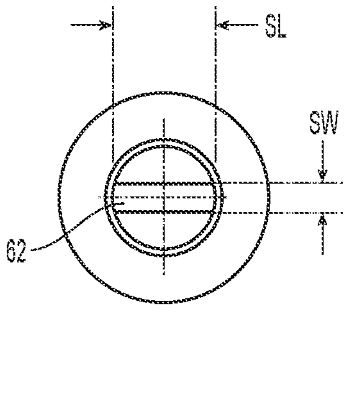
Figure 4D:
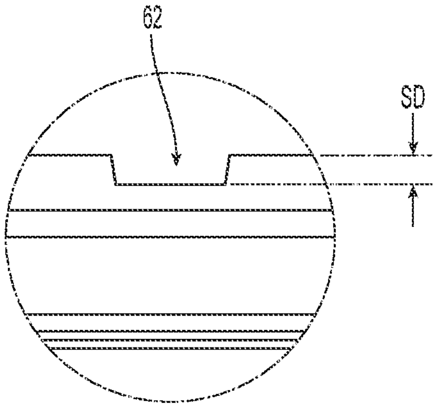

Referring to FIG. 3A, the flanged portion 58 has a face post 60 opposed to the sprinkler boss 20. The face post 60 preferably includes an elongated slot 62 defining the preferred recess of the seal assembly 50 and extending perpendicular to the sprinkler axis A--A in the direction or parallel to the plane P1 defined by the frame arms 18*a*, 18*b* and perpendicular to a bisecting plane P2 that intersects the plane P1 of the frame arms along the sprinkler axis A--A. The preferred link assembly 100 engages the elongated slot 62 to define the preferred orientation between the components to support or maintain the seal assembly 50 within the outlet 16 in the unactuated state of the sprinkler 10 for proper sprinkler operation in a corrosive atmosphere and more particularly extreme salt environment. Shown in FIGS. 4, 4A-4D are various views of the preferred seal assembly 50. The face post 60 is preferably a circular cylindrical formation with the elongated slot 62 preferably defined by a slot width SW and a slot length SL in which the slot length SL preferably extends the diameter of the circular face post 60. Alternatively, the face post 60 can be non-circular, where instead the elongated slot extends the entire width of the face 60. Moreover, where the elongated member 52 defines a total axial seat height STH, the slot length SL defines a preferred seat height-to slot length ratio STH:SL that ranges from 1:1 to 2:1. As seen in FIGS. 4B and 4D, the elongated slot 62 is defined by a slot depth SD which is preferably constant over its entire slot length SL. The slot depth SD can also be substantially constant over the slot width SW as seen in FIG. 4D or alternatively increase toward the slot center. The elongated slot 62 of the seat member 52 is configured to engage the link assembly 100 in the preferred manner as described herein. More particularly, the elongated slot 62 defines a sufficient area for contact with the link assembly 100 with sufficient space therebetween to minimize or eliminate corrosion bridging which may otherwise interfere with the proper separation of the components upon fusion of the link assembly. In preferred embodiments of the elongated member 52, the slot depth SD preferably ranges from about 0.01 in. to 0.025 in. and more preferably ranges from 0.012 to about 0.022 inch.

Referring again to FIGS. 1, 2 and 3 the preferred fusible link assembly 100 is disposed interiorly between the frame arms 18*a*, 18*b* and loaded against the seal assembly 50 by the screw member 80 that is threadedly engaged in the sprinkler boss 20 to generate a compressive force against the link assembly 100. The loading screw 80 includes an engagement tip 82 for engaging the link assembly 100 and a tool engagement end 84 to thread the loading screw 80 into the sprinkler boss 20. In preferred embodiments of the sprinkler 10 described herein, the load screw 80 and link assembly 100 also define a preferred geometric interaction that maintains the seal assembly 50 in a fluid tight sealed engagement with the internal sealing surface of the sprinkler body 12 against the force of the resilient seal 54 and any fluid pressure acting against the seal assembly 50. For the preferably corrosion resistant sprinkler, the screw member 80 is preferably constructed from 18-8 stainless steel.

Referring again to FIG. 3A, the preferred link assembly 100 is preferably a two-component assembly that is fused together by a thermally rated amount of solder. The preferred link assembly 100 includes a first trigger member 102 and a second support member 150 soldered to one another by a preferred volume of solder located or housed within and surrounding an indentation 152 formed in the support member 150. A preferred solder is a eutectic solder for 205° F. (96° C.) or alternatively a non-eutectic solder for 161° F. (72° C.). Each trigger member 102 and support member 150 are preferably constructed from beryllium nickel, such as for example, UNS-N03360 beryllium nickel. The components are preferably subject to one or more finishing coatings and more preferably a single finishing coating. In one illustrative two-coat finish, the components are finished with one coat of a primer to a thickness ranging from 0.7-1.2 MIL and another coat of a lacquer to a thickness ranging from 0.3-0.8 MIL.

The trigger member 102 includes a solder engagement portion 104 and a canopy or lever portion 106 that is coupled to and substantially skewed with respect to the solder engagement portion 104. More preferably, the canopy portion 106 extends perpendicularly with respect to the solder engagement portion 104. The canopy portion 106 also preferably extends so as to intersect the sprinkler longitudinal axis A--A. The canopy portion 106 has a first surface 108*a* opposed to the sprinkler boss 20 for engagement with the load screw member 80. The canopy portion 106 also has a second surface 108*b* opposite the first surface 108*a* and opposed to the flanged portion 58 of the elongated member 52 of the seal assembly 50 for a preferred contact with the support member 150.

The support member 150 has a first surface 154*a* in which the indentation 152 is formed for soldered engagement with the solder engagement portion 104 of the trigger member 102. An exposed second surface 154*b* of the support member shows the indentation 152 as a preferred linearly formed relief or projection 152 on the exposed surface 154*b*. As seen in the sprinkler assembly in FIG. 3A, the support member 150 has a first edge 156 for engagement with the elongated slot 62 of the seal assembly 50. A second edge 158 of the support member 150 is located adjacent the second surface 108*b* of the lever portion 106 of the trigger member 102. More preferably, the second edge 158 is in supporting contact with the lever portion 106 of the trigger 102 to define a pivot P about which the trigger member 102 rotates upon thermal actuation of the trigger.

Schematically shown are various forces acting on the trigger member 102 in the unactuated state. The first surface 108*a* includes the receptacle 110 formed in the first surface 108*a* for receipt of the leading tip portion 82 of the load screw member 80. The receptacle 110 locates application of the compression force F-screw, or a component thereof, from the screw member 80 at a distance X1 from the pivot P in a direction perpendicular the direction of force F-screw. Accordingly, the force applied by the screw member 80 applies a moment about the pivot P that acts to separate the link components 102, 150. Resisting the separating force is the reactive or resulting force F-Tens of the solder which acts at a distance Y1 from the pivot P in a direction perpendicular to the force F-Tens. Accordingly, the force F-Tens applies a counter-moment to that generated by the screw member 80 to maintain the link assembly in the unactuated state of the trigger. Upon fusion of the solder, the force F-Tens is reduced and the moment applied by the screw member 80 separates the components 102, 150 resulting in the collapse of the link assembly 100.

In preferred embodiments of the sprinkler 10 and its link assembly, the preferred distance X1 between the pivot and application of the load force F-screw can enhance the corrosion resistance performance of the sprinkler. In particular, the preferred arrangements can facilitate satisfaction of the 30-day salt spray fog and thermal sensitivity tests previously described. Accordingly, the moment generated by load F-Screw at the preferred distance X1 can overcome extreme salt corrosive effects that may otherwise interfere with the proper operation of the link assembly upon fusion of the solder. Moreover, the moment generated by load F-screw and distance X1 is of a sufficient size that the solder can maintain the link assembly 100 together with a force F-Tens in the unactuated state of the sprinkler for proper thermal response and in particular for proper standard response compliance in the thermal sensitivity test.

In one preferred embodiment of the link assembly 100, the receptacle 110 is configured to apply the load F-Screw at distance X1 ranging from 0.015-0.020 inch and preferably 0.018 inch from the pivot P. A preferred load F-Screw to form a fluid tight seal with the seal assembly 50 ranges from about 150-175 lbs-force. Resolving for the static force F-Tens required by the solder to maintain the assembly 100, the force F-Tens is applied at a preferred distance of about 0.4 inch and more preferably 0.38 inch from the pivot P and is preferably no less than 4 lbs-force and is more preferably about 8 lbs.-force. Accordingly, the link and the solder in an unactuated state preferably can withstand at least 8-lbs in tension without failing while providing the preferred thermal sensitivity for proper operation. Preferred embodiments of the non-frangible soldered assembly are configured for a preferred maximum load in tension of about 25 lbs.-force. Because the preferred 8-lbs. force at the solder from the applied moment of the load force is less than the maximum design load of the link assembly, the preferred link can maintain the preferred geometry to seal the sprinkler in an unactuated state and separate upon fusion of the solder material.

Shown in FIG. 3B is a detailed cross-sectional view of a preferred engagement between the receptacle 110 of the link assembly 100 and the screw tip 82 of load screw 80. As shown, the preferred receptacle 110 is a concave formation in the first surface 108*a* of the lever portion 106 that defines a maximum depth of the receptacle 110. In the engagement of the screw tip 82 within the receptacle 110, the screw tip 82 preferably contacts the bottom of the concave receptacle 110 and forms an annular gap 113 about the screw tip 82. In the embodiment shown, the annular gap 113 is at its maximum width at the surface 108*a* of the lever portion 106. Formation of the annular gap 113 between the load screw 80 and the receptacle is preferably defined by the difference in geometry between the receptacle 110 and the screw tip 82. In a preferred embodiment of the assembly forming a gap 113, the receptacle 110 defines a first radius of curvature R1 that is greater than a second radius of curvature R2 defined by the load screw 80. In alternate embodiments of the sprinkler assembly, the receptacle 110 can define a first radius of curvature equal to the second radius of curvature R2 of the load screw 80 such that there is no gap formation between the surface of the receptacle 110 and the screw tip 82. Accordingly, depending upon the receptacle 110 configuration, the first radius of curvature R1 and second radius of curvature R2 define a ratio R1:R2 that ranges from 1:1 to 1.25:1.

In an alternate embodiment (not shown), the receptacle 110 can be formed as a through hole in the lever portion 106 that extends from the first surface 108*a* through to the second surface 108*b*. Upon load screw 82 engagement, the screw tip 82 preferably extends through the lever portion 106 and is exposed to the surrounding atmosphere. The exposure can facilitate corrosion resistance where the load screw 82 is made of a self-passivating material. Depending upon the configuration of the through hole receptacle, the receptacle can be of a constant width, taper narrowly in the direction of increasing depth, or broaden in the direction of increasing receptacle depth. Accordingly, depending upon the configuration of the through hole receptacle, there can be a gap between the load screw and the through hole surface or none at all.

Alternatively or additionally, the receptacle 110 is defined by a perimeter geometry that circumscribes the engaged screw tip 82 at the first surface 108*a* of the lever portion 106. In another preferred aspect, the perimeter circumference can define a preferred ratio with the circumference of the screw tip 82 at the first surface 106*a* that ranges from 1:1 to 1.2:1. The perimeter of the receptacle 110 at the first surface 108*a* can be circular or non-circular, such as for example rectangular, oval, triangular or otherwise a non-symmetrical closed form. In an embodiment in which the perimeter is circular, the diameter of the receptacle perimeter defines a preferred ratio with the diameter of the engaged screw at the first surface 108*a* that ranges from 1:1 to 1.2:1.

The gap 113 is sufficiently large to minimize and more preferably eliminate any corrosion build-up between the screw tip 82 and the lever portion 106 of the link assembly 100 and thereby contribute to the corrosion resistance of the sprinkler assembly. Moreover, by minimizing the corrosion build-up at the site of the screw and link engagement, the surface of the load screw 82 can remain exposed to the surrounding atmosphere. Thus, in an embodiment in which the load screw 82 is fabricated from a self-passivating material such as, for example, a stainless steel alloy, the corrosion resistant coating of the load screw can be generated and/or maintained to contribute to the corrosion resistance of the sprinkler assembly.

Notwithstanding the ability of the preferred geometric relationship between the screw 80 and the link 100 to resist corrosion, the load screw 80 is preferably alternatively fabricated from a non-self-passivating corrosion resistant material. A preferred non-self-passivating material for fabrication of the load screw 80 is nickel alloy. Thus, to the extent any corrosion build-up forms between the screw tip 82 and the lever portion 106 of the link assembly 100, the non-self-passivating corrosion resistant coating of the screw member 80 is not negatively impacted by the deprivation of oxygen.

Figure 6:
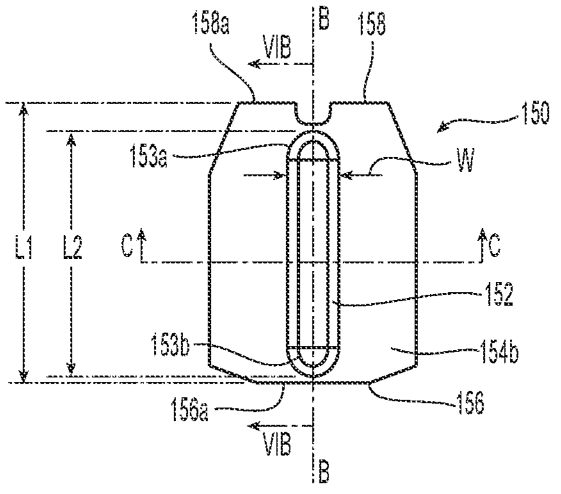
FIGS. 6, 6A & 6B are various views of a support member for use in the link assembly of FIG. 5.
Figure 6A:
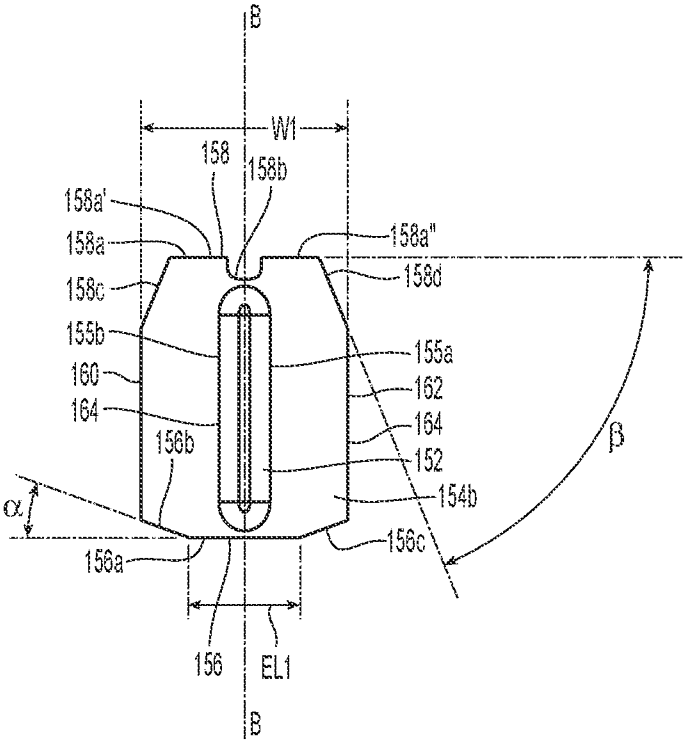
Figure 6B:
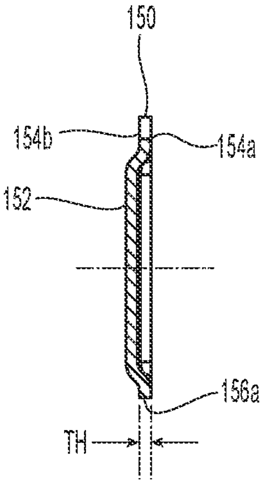

Shown in FIGS. 6, 6A and 6B is the support member 150. Each of the first and second edges 156, 158 has a linear portion 156*a*, 158*a* that extends perpendicular to a bisecting axis B--B. The linear portions 156*a*, 156 extends perpendicular to the sprinkler longitudinal axis A--A in the sprinkler assembly 10. The linear portion 156*a* of the first edge 156 is preferably engaged with the elongated slot 62 and has an edge length EL1 equal to the slot length SL of the elongated slot 60 of the elongated member 52. Moreover, the thickness TH of the support member 150 at the linear portion 156*a* of the first edge 156 is preferably smaller than the slot width SW of the elongated slot 62 of the seal assembly 50 and more preferably defines a slot width-to-support edge thickness ratio SW:TH that ranges from 2:1 to 2.5:1. Accordingly, for the preferred support and seat seal assembly engagement, the support edge 156 has sufficient surface contact to transfer the sealing force from the screw 80. Additionally, the wider slot width provides a gap about the support edge thickness so as to minimize and more preferably eliminate corrosion bridging between the support and the seat member, which may otherwise interfere with their proper separation. In preferred embodiments of the link assembly, each of the trigger and support members 102, 150 are of a material thickness ranging from 0.025-0.030 inch and more preferably 0.027 inch thick. Individually and in their assembly, the components provide sufficient strength to the link assembly 100 under the various loads to maintain the fluid-tight seal in the unactuated state of the sprinkler.

The linear portions 156*a*, 158*a* of the first and second edge 156, 158 are spaced apart along the bisecting axis B--B to define the maximum length L1 of the support member. The elongated indentation 152 is formed between the first and second edge 156, 158 and preferably extends parallel to and centered about the bisecting axis B--B. The preferably linear indentation 152 has a first end portion 153*a* and a second end portion 153*b* with the indentation 152 having a preferred constant width W from the first end portion 153*a* to the second end portion 152*b* such the indentation 152 is preferably symmetrical about a second axis C--C that is perpendicular to the first axis B--B. Accordingly, the preferred indentation 152 is formed to include a pair of spaced apart lateral linear edges 155*a*, 155*b* extending parallel to the bisecting axis B--B. In a preferred embodiment, the indentation 152 is vertically off center such that the second end portion 153*b* of the indentation 152 defines a first distance to the first edge 156 of the support member 150 and the first end portion 153*a* of the indentation 152 defines a second distance to the second edge 158 of the support member that is different and preferably larger than the first distance. The indentation 152 defines an indentation length L2 and more preferably defines a support member-to-indentation length ratio L1:L2 that ranges from 1.1:1 to 1.4:1. In alternate embodiments, the indentation 152 can define alternative configurations which is asymmetrical about the second axis C--C. The indentation 152 can, for example, have variable widths along its length to define alternate geometries, such as for example, T-shaped or cross-shaped.

The support member 150 has a first lateral edge 160 and a second lateral edge 162 extending parallel to one another and the bisecting axis B--B to define the maximum width W1 of the support member 150. The first and second edges 156, 158 of the support member 150 extend between the first and second lateral edges 160, 162. The length EL1 of the linear portion 156*a* of the first edge 156 and the maximum width W1 of the support member 150 define a preferred width-to-length ratio W1:EL1 ranging from of 1.5:1 to 2:1. In a preferred embodiment, the linear portion 156*a* of the first edge 156 is centered between the first and second lateral edges 160, 162. The first edge 156 includes a pair of transition portions 156*b*, 156*c* disposed about the central linear portion 156*a*. The transition portions 156*b*, 156*c* extending from the central linear portion 156*a* to one of the first and second lateral edges 160, 162. Each transition portion 156*b*, 156*c* is preferably linear and skewed with respect to the central linear portion 156*a* to define an acute transition angle α, which is preferably about twenty degrees (20°).

In another preferred aspect, the linear portion 158*a* of the second edge 158 includes two linear portions 158*a*', 158*a*"

with an arcuate portion 158*b* centered between the two linear portions. The second edge 158 also preferably includes a pair of transition portions 158*c*, 158*d* disposed about the two linear portions 158*a*. Each transition portion 158*c*, 158*d* extend from the two linear portions to one of the first and second lateral edges 156, 158. Each transition portion 158*c*, 158*d* is preferably linear and skewed with respect to the two linear portions to define an acute transition angle β, which preferably ranges from 65-70 degrees and is more preferably sixty-eight degrees (68°). Given, the transition portions at each of the first and second edges 156, 158 of the support member 150, the first and second lateral edges 160, 162 of the support member 150 are preferably smaller than the pair of lateral edges 153*a*, 153*b* of the indentation 152.

Figure 5:
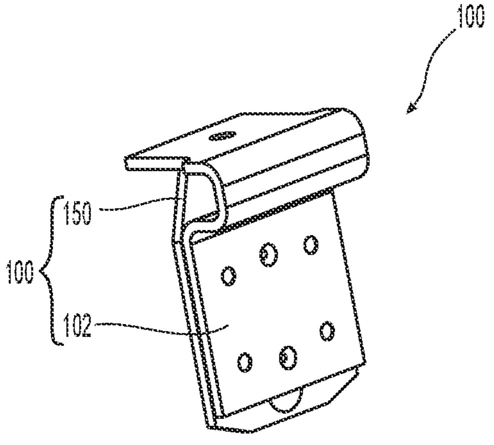
FIG. 5 is a perspective view of a preferred non-frangible thermally responsive link assembly for use in the sprinkler of FIG. 1.
Figure 5A:
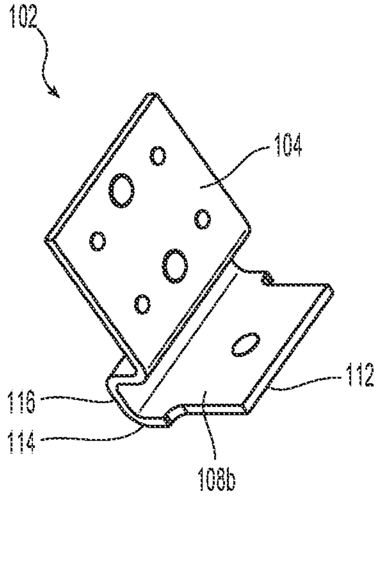
FIGS. 5A-5C are various views of a preferred trigger member for use in the link assembly of FIG. 5.
Figure 5B:
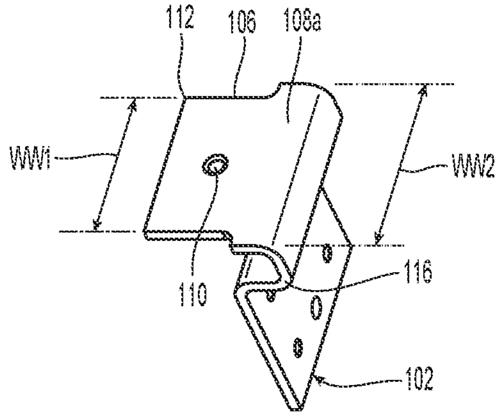

As seen in FIGS. 5A, 5B, the first and second surfaces 108*a*, 108*b* of the canopy portion 106 are preferably parallel to one another to define the canopy portion 106 as a substantially planar member and more preferably a polygonal planar member. The canopy portion 106 includes a free leading end 112 having a first width WW1 and an opposite trailing end 114 contiguous with the solder engagement portion having a second width WW2. The first width WW1 is preferably different than the second width WW2 and more preferably is less than the second width WW2.

Figure 5C:
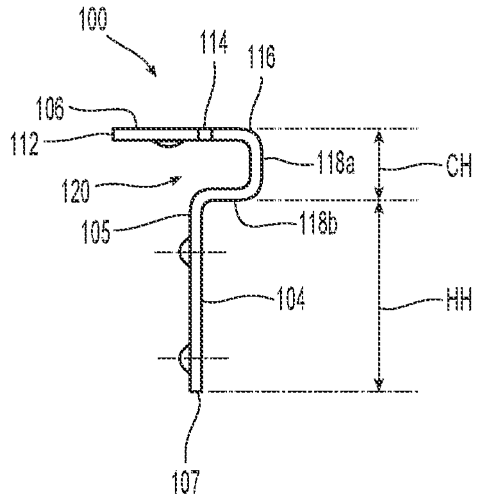

The trigger member 102 preferably includes a connector portion 116 formed between the solder engagement portion 104 and the opposite trailing end 114 of the canopy portion 106. Laterally, the connector portion 116 preferably locates the solder engagement portion 104 closer to the opposite trailing end 114 of the canopy portion 106 than the free leading end 112. With reference to FIG. 5C, the connector portion 116 includes a first planar portion 118*a* and a second planar portion 118*b*.

Shown in FIG. 3A is a detailed view of the link assembly 100 within the sprinkler frame. The cross-section of the interior channel 120 preferably defines a centroid C disposed preferably to a side of the solder engagement portion 104 opposite the line of action of the load screw, which is substantially aligned with the sprinkler axis A--A. Accordingly in the preferred sprinkler assembly 10, the solder engagement portion 104 of the trigger 102 is centered between the line of action of the load screw 80 and the centroid C. More preferably, the centroid C and the line of action are spaced apart by a distance of about 0.1 inch. Alternatively, or additionally, the interior channel is configured so as to approximately locate the centroid C closer to the lever or canopy portion 106 than the support member 150. In a preferred embodiment the centroid C is approximated as being at the intersection of the mid-line of the channel height CH and a line between and parallel to the support member 150 and the first planar portion 118*a*. More preferably, the approximate centroid C defines a preferred ratio of distances to support member (C-150)-to-distance to canopy portion (C-106) that ranges from 1:1 to 2.5:1 and is more preferably about 1.2:1.

Referring again to FIG. 5C, the solder engagement portion 104 includes a first end 105 contiguous with the connector 116 and an opposite terminal end 107. The free leading canopy end 112 of the canopy portion 106 is axially spaced from the terminal end 107 of the solder engagement portion 104 to define a height HH of the trigger 102 to define a trigger height-to-Channel height ratio (HH:CH) that ranges from 2:1 to 3:1. The height HH of the trigger 102 and its soldered engagement with the support member 150 keeps the terminal end 107 of the trigger 102 out of the elongated slot 62 of the seal assembly 50. To facilitate appropriate engagement with and separation from the support member 150, the interior surface of the solder engagement portion 104 preferably includes one or more dimples or projections for alignment with the preferred indentation 152 of the support member and one or more receptacle disposed about the dimples.

The preferred fusible link assembly 100 provides for a preferred two-piece non-frangible thermally responsive assembly. Other two-piece fusible link assemblies can be used with the preferred seal assembly provided the link assembly defines the preferred engagement geometry with the seal assembly to transfer the sealing force from the compressive screw member while minimizing or eliminating corrosion build-up therebetween to provide a corrosion resistant non-frangible thermally responsive fluid control.

In other alternate embodiments, the non-frangible thermally responsive link assembly can be alternatively embodied in an assembly having more than two components. For example, instead of the support and trigger members being directly held together by the solder material, the assembly can incorporate a fastener (not shown) which holds the support and trigger member in an assembled relationship to transfer the sealing force to the seal assembly. The fastener can be held in place by the solder material such that upon fusion of the solder material, the fastener separates from the support and trigger members thereby permitting the link assembly to collapse and the sprinkler is actuated. In another alternative embodiment, the support and trigger members can be configured and positioned for transfer of the sealing force indirectly to the seal assembly. For example, the support and trigger members can be joined by the solder material to instead hold a strut and lever in an assembled orientation which transfers the compressive force of the screw member to the seal assembly. In such an arrangement, upon fusion of the solder material and separation of the support and trigger members, the lever member and strut members collapse and the sprinkler is actuated, The preferred embodiments of sprinkler assembly and extreme salt corrosion testing provide preferred methods of qualifying a sprinkler for corrosion resistance and providing corrosion resistant fire protection in which the sprinkler has a non-frangible thermally responsive fluid control assembly. A preferred method of corrosion resistant fire protection includes obtaining a fire protection sprinkler having a non-frangible thermally responsive fluid control assembly that is qualified for resistance to an extreme salt environment by corrosion testing the sprinkler in a manner as described herein. Obtaining a fire protection sprinkler can include any one of manufacturing, acquiring and/or purchasing the sprinkler. The method further preferably includes distributing the sprinkler for installation in a corrosive environment, which preferably includes giving, supplying, selling or otherwise providing the sprinkler for installation and use in a corrosive environment application.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A corrosion resistant fire protection sprinkler comprising:

a sprinkler frame body of corrosion resistant material having an inlet and an outlet with a passageway disposed therebetween along a sprinkler longitudinal axis;

a fluid deflecting member spaced from the outlet and coupled to a sprinkler boss;

a seal assembly disposed within the outlet; and a link assembly means for non-frangible thermal actuation control after exposure to an extreme salt environment, wherein the link assembly means include a trigger member and a support member contacting the trigger member, wherein the trigger member comprises a connector portion between a first portion and a second portion, the first portion contacting the support member to define a pivot point, the second portion having a terminal end disposed between the seal assembly and the sprinkler boss and confronting the seal assembly, and the connector portion defining a centroid to a side of the first portion, and wherein (i) the pivot point is offset from the sprinkler longitudinal axis, and/or (ii) the trigger member and the support member are compressed between the sprinkler boss and the seal assembly, and/or (iii) the trigger member is positioned to, upon melting of a fusible, temperature responsive solder, rotate about the pivot point away from the support member due to a moment generated by a compressive force applied to the seal assembly, and/or (iv) the support member and the trigger member extend along a link axis non-parallel to the sprinkler longitudinal axis, wherein the means, after thirty days of exposure to a salt spray fog, maintains a fluid tight seal at the outlet, and wherein the means has a thermal sensitivity and after the thirty days of exposure to the salt spray fog, thermally actuates in accordance with its thermal sensitivity, and/or wherein the means has a normal operating temperature and after the thirty days of exposure to the salt spray fog, thermally actuates in a heated bath test raised to the normal operating temperature.

2. The sprinkler of claim 1, wherein the seal assembly includes a recess positioned to receive and contact the support member, and wherein a ratio of an area of the recess exposed to an area of the recess in contact with the support member is between 2:1 and 2.5:1.

3. The sprinkler of claim 1, further comprising:

a load screw in threaded engagement with the sprinkler boss, wherein a lever portion of the trigger member includes a receptacle to receive and contact the load screw, and wherein a ratio of a width of a gap between the load screw and the receptacle to a depth of the receptacle is between 2:1 and 3:1.

4. The sprinkler of claim 1, wherein the link axis intersects the sprinkler longitudinal axis at a point at which the support member contacts the seal assembly.

5. The sprinkler of claim 1, further comprising a load screw positioned to apply a compressive force to the seal assembly through a lever portion of the trigger member and the support member.

6. The sprinkler of claim 1, further comprising:

a load screw comprising a non-self-passivating screw in threaded engagement with the sprinkler boss to generate a compressive force against the trigger member and the support member.

7. The sprinkler of claim 1, further comprising a load screw, wherein a lever portion of the trigger member includes a receptacle or a through hole positioned to receive the load screw, and wherein the load screw comprises a self-passivating screw.

8. The sprinkler of claim 1, further comprising a load screw, wherein a lever portion of the trigger member includes a receptacle to receive and contact the load screw, wherein the receptacle has a first curvature defined by a first radius, wherein a portion of the load screw contacting the receptacle has a second curvature defined by a second radius, and wherein a ratio of the first radius to the second radius is between 1:1 and 1.25:1.

9. The sprinkler of claim 1, wherein the link assembly means further include a solder material that directly holds the trigger member to the support member.

10. The sprinkler of claim 1, wherein the link assembly means further include a fastener coupling the trigger member to the support member.

11. The sprinkler of claim 1, wherein the link assembly means further includes a solder material that directly holds or a fastener that holds the trigger member to the support member.

12. The sprinkler of claim 1, wherein (i) the pivot point is offset from the sprinkler longitudinal axis, and (ii) the trigger member and the support member are compressed between the sprinkler boss and the seal assembly.

13. The sprinkler of claim 1, wherein (i) the trigger member is positioned to, upon melting of the fusible, temperature responsive solder, rotate about the pivot point away from the support member due to a moment generated by a compressive force applied to the seal assembly, and (ii) the support member and the trigger member extend along the link axis non-parallel to the sprinkler longitudinal axis.

14. The sprinkler of claim 1, wherein each of the sprinkler frame body and the fluid deflecting member consists of stainless steel.

15. The sprinkler of claim 1, wherein the sprinkler frame body includes a wrench boss configuration.

16. The sprinkler of claim 1, further comprising:

a load screw in threaded engagement with the sprinkler boss, wherein the trigger member includes a solder engagement portion and a lever portion extending from the solder engagement portion, and wherein the link assembly means define a centroid disposed to a side of the solder engagement portion opposite to a line of action of the load screw.

17. The sprinkler of claim 1, wherein the trigger member includes a solder engagement portion and a lever portion extending from the solder engagement portion, and wherein the lever portion intersects the sprinkler longitudinal axis.

18. The sprinkler of claim 1, wherein the trigger member includes a lever portion, and wherein the support member includes a first edge configured to engage with the seal assembly and a second edge in supporting contact with the lever portion to define the pivot point.

19. The sprinkler of claim 1, wherein the sprinkler defines a nominal K-factor ranging from 5.6 to 14.0 GPM/(psi)$^{1/2}$.

20. The sprinkler of claim 1, wherein the trigger member includes a solder engagement portion and a lever portion extending from the solder engagement portion, wherein the lever portion is positioned to press toward the sprinkler boss.

21. The sprinkler of claim 20, wherein the support member is positioned to press toward the seal assembly, and wherein the support member remains in contact with the trigger member by a fusible, temperature responsive solder at the solder engagement portion.

22. The sprinkler of claim 1, wherein the support member contacts the seal assembly.

23. The sprinkler of claim 22, wherein the seal assembly includes an elongated slot, and wherein the support member includes a first edge configured to engage the elongated slot of the seal assembly.

24. The sprinkler of claim 1, wherein each of the trigger member and the support member consists of a nickel alloy.

25. The sprinkler of claim 24, wherein the nickel alloy consists of beryllium nickel.

26. The sprinkler of claim 1, further comprising a pair of frame arms extending from the sprinkler frame body and converging toward the sprinkler longitudinal axis.

27. The sprinkler of claim 26, wherein the pair of frame arms converge toward the sprinkler longitudinal axis to form a sprinkler boss, and wherein the fluid deflecting member is coupled to the sprinkler boss.

28. A fire protection sprinkler comprising:

a stainless steel sprinkler frame body having an inlet and an outlet with a passageway disposed therebetween along a sprinkler longitudinal axis;

a stainless steel fluid deflecting member spaced from the outlet and coupled to a sprinkler boss;

a seal assembly disposed within the outlet; and a link assembly means for non-frangible thermal actuation control after exposure to an extreme salt environment, wherein the link assembly means include a nickel alloy trigger member and a nickel alloy support member contacting the trigger member, wherein:

the trigger member comprises a connector portion between a first portion and a second portion, the first portion contacting the support member to define a pivot point, the second portion having a terminal end between the seal assembly and the sprinkler boss and confronting the seal assembly, and the connector portion defining a centroid to a side of the first portion, and the pivot point is offset from the sprinkler longitudinal axis, and/or the trigger member and the support member are compressed between the sprinkler boss and the seal assembly, and/or the trigger member is positioned to, upon melting of a fusible temperature responsive solder, rotate about the pivot point away from the support member due to a moment generated by a compressive force applied to the seal assembly, and/or the support member and the trigger member extend along a link axis non-parallel to the sprinkler longitudinal axis, wherein:

the means, after thirty days of exposure to a salt spray fog, maintains a fluid tight seal at the outlet, and the means has a thermal sensitivity and, after the thirty days of exposure to the salt spray fog, thermally actuates in accordance with its thermal sensitivity, and/or the means has a normal operating temperature and, after the thirty days of exposure to the salt spray fog, thermally actuates in a heated bath test raised to the normal operating temperature.

29. The sprinkler of claim 28, wherein:

the pivot point is offset from the sprinkler longitudinal axis, and the trigger member and the support member are compressed between the sprinkler boss and the seal assembly, and the trigger member is positioned to, upon melting of the fusible, temperature responsive solder, rotate about the pivot point away from the support member due to a moment generated by a compressive force applied to the seal assembly, and the support member and the trigger member extend along the link axis non-parallel to the sprinkler longitudinal axis.

30. The sprinkler of claim 28, wherein each of the trigger member and the support member consists of a nickel alloy.

31. The sprinkler of claim 28, wherein each of the sprinkler frame body and the fluid deflecting member consists of stainless steel.

32. The sprinkler of claim 28, wherein the sprinkler frame body includes a wrench boss configuration.

33. The sprinkler of claim 28, further comprising:

a load screw in threaded engagement with the sprinkler boss, wherein the trigger member includes a solder engagement portion and a lever portion extending from the solder engagement portion, and wherein the link assembly means define a centroid disposed to a side of the solder engagement portion opposite to a line of action of the load screw.

34. The sprinkler of claim 28, wherein the trigger member includes a solder engagement portion and a lever portion extending from the solder engagement portion, and wherein the lever portion intersects the sprinkler longitudinal axis.

35. The sprinkler of claim 28, wherein the trigger member includes a lever portion, and wherein the support member includes a first edge configured to engage with the seal assembly and a second edge in supporting contact with the lever portion to define the pivot point.

36. The sprinkler of claim 28, wherein the sprinkler defines a nominal K-factor of 5.6 or 8.0 GPM/(psi)$^{1/2}$.

37. The sprinkler of claim 28, further comprising a pair of frame arms extending from the sprinkler frame body and converging toward the sprinkler longitudinal axis.

38. The sprinkler of claim 37, wherein the pair of frame arms converge toward the sprinkler longitudinal axis to form a sprinkler boss, and wherein the fluid deflecting member is coupled to the sprinkler boss.

* * * * *